(12) United States Patent
Song (10) Patent No.: US 10,698,249 B2
(45) Date of Patent: Jun. 30, 2020

(54) WINDOW SUBSTRATE, METHOD OF MANUFACTURING THE SAME AND IMAGE DISPLAY DEVICE INCLUDING THE SAME

(71) Applicant: DONGWOO FINE-CHEM CO., LTD., Jeollabuk-do (KR)

(72) Inventor: Byung Hoon Song, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 0 days.

(21) Appl. No.: 16/381,481

(22) Filed: Apr. 11, 2019

(65) Prior Publication Data
US 2019/0235308 A1 Aug. 1, 2019

Related U.S. Application Data

(63) Continuation of application No. PCT/KR2017/011216, filed on Oct. 12, 2017.

(30) Foreign Application Priority Data

Oct. 12, 2016 (KR) .................. 10-2016-0131834

(51) Int. Cl.
*G02F 1/1335* (2006.01)
*G02F 1/1333* (2006.01)
(Continued)

(52) U.S. Cl.
CPC ......... *G02F 1/133512* (2013.01); *G02B 1/04* (2013.01); *G02B 1/14* (2015.01);
(Continued)

(58) Field of Classification Search
None
See application file for complete search history.

(56) References Cited

U.S. PATENT DOCUMENTS

2002/0051106 A1* 5/2002 Nagashima ....... G02F 1/133512
349/110
2002/0191131 A1* 12/2002 Ota ................... G02F 1/133512
349/110
(Continued)

FOREIGN PATENT DOCUMENTS

KR 10-2012-0076026 A 7/2012
KR 10-2014-0084586 A 7/2014
(Continued)

OTHER PUBLICATIONS

International Search Report for PCT/KR2017/011216 dated Jan. 22, 2018.

*Primary Examiner* — Ryan Crockett
(74) *Attorney, Agent, or Firm* — The PL Law Group, PLLC (57) ABSTRACT

A window substrate includes a base substrate including a display region and a non-display region, a light-shielding pattern disposed on a surface of the base substrate in the non-display region to define the display region and the non-display region, a first adhesive layer formed along a surface of the light-shielding pattern and the surface of the base substrate, a polarizing layer on the first adhesive layer, and a touch sensor layer on the polarizing layer. A viscoelasticity ratio of the light-shielding pattern relative to the first adhesive layer is 75,000 or less, and a thickness ratio of the light-shielding pattern relative to the first adhesive layer is 0.6 or less.

17 Claims, 3 Drawing Sheets

(51) Int. Cl.
  *G02B 5/30* (2006.01)
  *G06F 3/041* (2006.01)
  *G02B 1/04* (2006.01)
  *G02B 5/00* (2006.01)
  *G02B 1/14* (2015.01)

(52) U.S. Cl.
  CPC ........... *G02B 5/003* (2013.01); *G02B 5/3016* (2013.01); *G02F 1/13338* (2013.01); *G02F 1/133528* (2013.01); *G06F 3/0412* (2013.01)

(56) References Cited

U.S. PATENT DOCUMENTS

| | | | | |
|---|---|---|---|---|
| 2005/0052737 | A1* | 3/2005 | Amemiya | G03B 21/62 |
| | | | | 359/456 |
| 2006/0071889 | A1* | 4/2006 | Yang | G02F 1/13338 |
| | | | | 345/87 |
| 2011/0254790 | A1* | 10/2011 | Suzuki | B32B 7/12 |
| | | | | 345/173 |
| 2014/0049699 | A1* | 2/2014 | Huang | G02B 5/3016 |
| | | | | 349/12 |

FOREIGN PATENT DOCUMENTS

| | | | |
|---|---|---|---|
| KR | 10-2014-0134147 A | | 11/2014 |
| KR | 10-2015-0009310 | * | 1/2015 |
| KR | 10-2015-0009310 A | | 1/2015 |

* cited by examiner

WINDOW SUBSTRATE, METHOD OF MANUFACTURING THE SAME AND IMAGE DISPLAY DEVICE INCLUDING THE SAME

CROSS REFERENCE TO RELATED APPLICATIONS AND CLAIM OF PRIORITY

The present application is a continuation application to International Application No. PCT/KR2017/011216 with an International Filing Date of Oct. 12, 2017, which claims the benefit of Korean Patent Application No. 10-2016-0131834 filed on Oct. 12, 2016, at the Korean Intellectual Property Office, the disclosures of which are incorporated by reference herein in their entirety.

BACKGROUND

1. Field

The present invention relates to a window substrate, a method of manufacturing the same and an image display device including the same. More particularly, the present invention relates to a window substrate including a plurality of functional layers, a method of manufacturing the same and an image display device including the same.

2. Description of the Related Art

Recently, a display device capable of showing information including a display image has been actively developed. The display device includes a liquid crystal display (LCD) device, an organic light emitting display (OLED) device, a plasma display panel (PDP) device, a field emission display (FED) device, etc.

In the display device, a window substrate may be disposed on a display panel such as an LCD panel and an OLED panel to protect the display panel from an external environment. The window substrate may include a base substrate formed of glass. A transparent plastic material is applied as a base substrate to be employed in a recent flexible display device.

Additional members of the display device such as a polarizing plate, a touch screen panel, etc., may be disposed between the base substrate and the display panel. For example, an ambient light reflected from an electrode pattern of the display panel may be blocked by the polarizing plate. An instruction of a user may be input through the touch screen panel.

However, when a plurality of layers or structures including the polarizing plate, the touch screen panel, the window substrate, etc., are stacked on the display panel, demands in a recent display device such as a flexible property, a thin-layered structure, etc., may not be sufficiently realized. Further, physical, mechanical or chemical defects may be caused during laminating the plurality of layers or structures, and a process cost may be also increased.

For example, Korean Laid-Open Patent Publication No. 2012-0076026 discloses a transparent substrate including a touch screen panel and a polarizing layer.

SUMMARY

According to an aspect of the present invention, there is provided a window substrate having improved mechanical reliability and flexible property.

According to an aspect of the present invention, there is provided a method of manufacturing a window substrate having improved mechanical reliability and flexible property.

According to an aspect of the present invention, there is provided an image display device including a window substrate having improved mechanical reliability and flexible property.

The above aspects of the present inventive concepts will be achieved by the following characteristics:

(1) A window substrate, comprising a base substrate including a display region and a non-display region; a light-shielding pattern disposed on a surface of the base substrate in the non-display region to define the display region and the non-display region; a first adhesive layer formed along a surface of the light-shielding pattern and the surface of the base substrate; a polarizing layer on the first adhesive layer; and a touch sensor layer on the polarizing layer, wherein a viscoelasticity ratio of the light-shielding pattern relative to the first adhesive layer is 75,000 or less, and a thickness ratio of the light-shielding pattern relative to the first adhesive layer is 0.6 or less.

(2) The window substrate according to the above (1), wherein the viscoelasticity ratio is in a range from 3,000 to about 75,000.

(3) The window substrate according to the above (1), wherein the thickness ratio is in a range from 0.1 to 0.6.

(4) The window substrate according to the above (1), wherein a taper angle of a sidewall of the light-shielding pattern with respect to the surface of the base substrate is in a range from 5° to 30°.

(5) The window substrate according to the above (1), wherein the polarizing layer includes a liquid crystal layer.

(6) The window substrate according to the above (1), wherein the first adhesive layer is relatively thicker on the display region.

(7) The window substrate according to the above (6), wherein the thickness ratio is defined as a ratio of a thickness of the light-shielding pattern relative to a thickness of the first adhesive layer on the display region.

(8) The window substrate according to the above (6), wherein the first adhesive layer has a plane top surface.

(9) The window substrate according to the above (1), further comprising a second adhesive layer interposed between the polarizing layer and the touch sensor layer.

(10) The window substrate according to the above (9), wherein the second adhesive layer has a plane top surface.

(11) The window substrate according to the above (1), wherein the base substrate includes at least one selected from a group consisting of polyethersulphone, polyacrylate, polyetherimide, polyethylene naphthalate, polyethylene terephthalate, polyphenylene sulfide, polyallylate, polyimide, polycarbonate, cellulose triacetate and cellulose acetate propionate.

(12) A method of manufacturing a window substrate, comprising forming a polarizing layer and a touch sensor layer on a first substrate layer and a second substrate layer, respectively; laminating the first substrate layer and the second substrate layer such that the polarizing layer and the touch sensor layer face each other to form a first laminate; forming a light-shielding pattern and a first adhesive layer on a base substrate to form a second laminate; and laminating the first laminate and the second laminate such that the first adhesive layer and the polarizing layer face each other.

(13) The method according to the above (12), further comprising removing the first substrate layer after forming the first laminate.

(14) The method according to the above (13), further comprising removing the second substrate layer after forming the first laminate or after laminating the first laminate and the second laminate.

(15) The method according to the above (12), wherein the light-shielding pattern is formed on a peripheral portion of a surface of the base substrate, and the first adhesive layer is formed on the surface of the base substrate to cover the light-shielding pattern.

(16) The method according to the above (15), wherein a viscoelasticity ratio of the light-shielding pattern relative to the first adhesive layer is 75,000 or less, and a thickness ratio of the light-shielding pattern relative to the first adhesive layer is 0.6 or less.

(17) The method according to the above (16), wherein the viscoelasticity ratio is in a range from 3,000 to about 75,000.

(18) The method according to the above (16), wherein the thickness ratio is in a range from 0.1 to 0.6.

(19) An image display device comprising the window substrate according to any one of the above (1) to (11).

The window substrate of the present invention may include a light-shielding pattern and an adhesive layer formed to have predetermined viscoelasticity ratio and thickness ratio so that a bubble generation due to a stepped portion caused by the light-shielding pattern when forming the adhesive layer may be suppressed. Thus, an adhesion property and a mechanical reliability of the adhesive layer may be improved, and a flexible property may be also improved.

The window substrate of the present invention may include a polarizing layer and a touch sensor layer formed from a transfer process and an attachment process. Accordingly, the window substrate integrated with the polarizing layer and the touch sensor layer may be achieved while preventing or reducing process failures.

DETAILED DESCRIPTION

The present invention relates to a window substrate including a base substrate; a light-shielding pattern defining a display region and a non-display region, the light-shielding pattern being disposed on a surface of the base substrate corresponding to the non-display region; a first adhesive layer formed along a surface of the light-shielding pattern and the surface of the base substrate; a polarizing layer on the first adhesive layer; and a touch sensor layer on the polarizing layer. The window substrate has a viscoelasticity ratio and a thickness ratio of the light-shielding pattern relative to the first adhesive layer within predetermined ranges to have a high reliability and a flexible property while preventing bubbles due to stepped portions.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
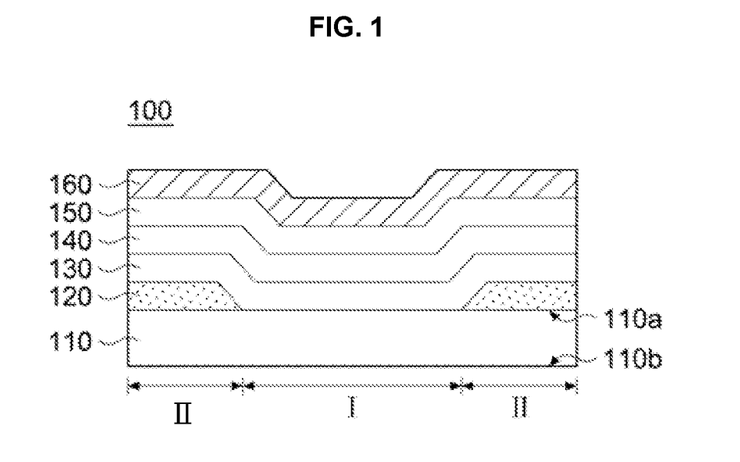
FIG. 1 is a schematic cross-sectional view illustrating a window substrate in accordance with an example embodiment of the present invention.

Referring to FIG. 1, a window substrate 100 according to embodiments of the present invention includes a base substrate 110, a light-shielding pattern 120, a first adhesive layer 130, a polarizing layer 140, a second adhesive layer 150 and a touch sensor layer 160.

The base substrate 110 may include a transparent material having a durability to an external shock which may be applied to an LCD device, an OLED device, a touch screen panel (TSP). The base substrate 110 may include a flexible plastic material having a flexible property. In this case, a display device to which the base substrate 100 is applied may be a flexible display device.

For example, the base substrate 110 may include polyethersulphone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (TAC), cellulose acetate propionate (CAP), etc. These may be used alone or in a combination thereof.

As illustrated in FIG. 1, the base substrate 110 may include a first surface 110*a* and a second surface 110*b* facing each other. Layers or structures of the window substrate 100 may be stacked on the first surface 110*a*. An image may be displayed to a user via the second surface 110*b*, and an instruction of the user may be input (e.g., by a touch of the user) through the second surface 110*b*.

The light-shielding pattern 120 may be disposed on the first surface 110*a* of the base substrate 110, and may be formed on a peripheral portion of the base substrate 110. For example, a display region I and a non-display region II of the window substrate 100 and/or the base substrate 110 may be divided by the light-shielding pattern 120.

The display region I may be defined as a region of the window substrate 100 and/or the base substrate 110 exposed from the light-shielding pattern 120. The non-display region II may be defined as a region of the window substrate 100 and/or the base substrate 110 overlapping the light-shielding pattern 120.

The light-shielding pattern 120 may be provided as at least a portion of a bezel or a housing of the window substrate 100 or the display device including the window substrate 100. For example, wirings of the display device may be covered by the light-shielding pattern 120 to be invisible to the user. A color and/or a material of the light-shielding pattern 120 may not be specifically limited, and may be formed of a resin material having various colors such as a black color, a white color, a gold color, etc. For example, the light-shielding pattern 120 may be formed of the resin material such as an acryl-based resin, an epoxy-based resin, polyurethane, a silicone resin, etc., in which a pigment for implementing the color may be mixed. The light-shielding pattern 120 may be formed as a single-layered structure or a multi-layered structure.

The material and a thickness of the light-shielding pattern 120 may be determined in consideration of a protection and a flexibility of the window substrate 100 or the display device. In an implementation of the present invention, the material of the light-shielding pattern 120 may be selected so that a storage modulus of the light-shielding pattern 120 may be in a range from about 2,000 MPa to about 5,000 MPa. The thickness of the light-shielding pattern 120 may be in a range from about 6 μm to about 15 μm.

The light-shielding pattern 120 may include a sidewall tapered with a predetermined angle with respect to the first surface 110a of the base substrate 110. For example, the sidewall of the light shielding pattern 120 adjacent to the display region I may have a taper angle in a range from about 5° to about 30°. If the taper angle is less than about 5°, a sufficient thickness of the light shielding pattern 120 may not be obtained. If the taper angle exceeds about 30°, a delamination of the first adhesive layer 130 may be caused at the display region I.

The first adhesive layer 130 may be disposed on the light-shielding pattern 120 and the base substrate 110. In an implementation of the present invention, the first adhesive layer 130 may be directly formed on a top surface and the sidewall of the light-shielding pattern 120, and on the first surface 110a of the base substrate 110. Further, the first adhesive layer 130 may continuously extend throughout the display region I and the non-display region II. The first adhesive layer 130 may have a substantially uniform thickness throughout the display region I and the non-display region II.

A material of the first adhesive layer 130 is not specifically limited, however may be selected in consideration of an adhesion to the light shielding pattern 120 and a viscoelasticity of the first adhesive layer 130. For example, the first adhesive layer 130 may include an acrylate-based pressure sensitive adhesive (PSA) or an optically clear adhesive (OCA).

According to embodiments of the present invention, a storage modulus of the first adhesive layer 130 may be in a range from about 0.04 MPa to about 0.6 MPa. Further, a thickness of the first adhesive layer 130 may be controlled within about 25 μm to about 50 μm.

For example, a viscoelasticity ratio and a thickness ratio between the light-shielding pattern 120 and the first adhesive layer 130 may be defined according to the above-mentioned ranges of the storage modulus and thickness of the light-shielding pattern 120 and the first adhesive layer 130.

According to the present invention, the viscoelasticity ratio (e.g., a storage modulus ratio) of the light-shielding pattern 120 relative to the first adhesive layer 130 may be about 75,000 or less. If the viscoelasticity ratio exceeds about 75,000, a storage modulus gap between the first adhesive layer 130 and the light-shielding pattern 120 may be excessively increased. Accordingly, for example, detachment or delamination may be caused when bending or folding the window substrate 100 or the display device having flexible property. In some embodiments, the viscoelasticity ratio may be in a range from about 3,000 to about 75,000.

The thickness ratio of the light-shielding pattern 120 relative to the first adhesive layer 130 may be about 0.6 or less. If the thickness ratio exceeds about 0.6, the thickness of the light-shielding pattern 120 may be excessively increased to be disadvantageous in obtaining a thin dimension structure and flexible property. Further, detachment or delamination of the first adhesive layer 130 may be also caused. In some embodiments, the thickness ratio may be in a range from about 0.1 to about 0.6.

Within the ranges of the viscoelasticity ratio and the thickness ratio, bubble generation between the first adhesive layer 130 and the base substrate 110 and/or between the first adhesive layer 130 and the sidewall of the light-shielding pattern 120 may be prevented while attaching the first adhesive layer. Additionally, damages and delamination of the first adhesive layer 130 or layers on the first adhesive layer 130 may be prevented when folding or bending the window substrate 100 or the display device.

The polarizing layer 140 may be disposed on the first adhesive layer 130. For example, the polarizing layer 140 may extend continuously throughout the display region I and the non-display region II. According to embodiments of the present invention, the polarizing layer 140 may replace a conventional polarizing plate which includes a polarizer (e.g., a polyvinyl alcohol (PVA)-based polarizer) and protective films (e.g., triacetyl cellulose (TAC) films) attached to both faces of the polarizer. In some embodiments, the polarizing layer 140 may include a liquid crystal compound. The polarizing layer 140 may include a liquid crystal layer containing the liquid crystal compound, and may further include an alignment layer providing an orientation to the liquid crystal layer.

The touch sensor layer 160 may be disposed on the polarizing layer 140. The touch sensor layer 160 may include electrode patterns configured to convert a touch signal from the user through the second surface 110b of the base substrate 110 into an electrical signal. For example, the electrode patterns may include first sensing electrodes and second sensing electrodes arranged in directions crossing each other.

The touch sensor layer 160 may further include an insulation layer for insulating the first and second sensing electrodes from each other. Peripheral wirings connected to the first and second sensing electrodes may be further formed in the touch sensor layer 160. The peripheral wirings may be arranged in the non-display region II and may overlap the light-shielding pattern 120.

As illustrated in FIG. 1, the second adhesive layer 150 may be formed between the touch sensor layer 160 and the polarizing layer 140. The second adhesive layer 150 may include a PSA-based material or an OCA-based material substantially the same as or similar to that of the first adhesive layer 130.

In some embodiments of the present invention, additional layer structures for improving physical and optical properties of the window substrate 100 may be further included. For example, a hard coating layer for protection the window substrate 100 may be formed on the second surface 110b of the base substrate 110. A retardation film, a refractive index adjusting layer, etc., may be further formed on the polarizing layer 140.

Figure 2:
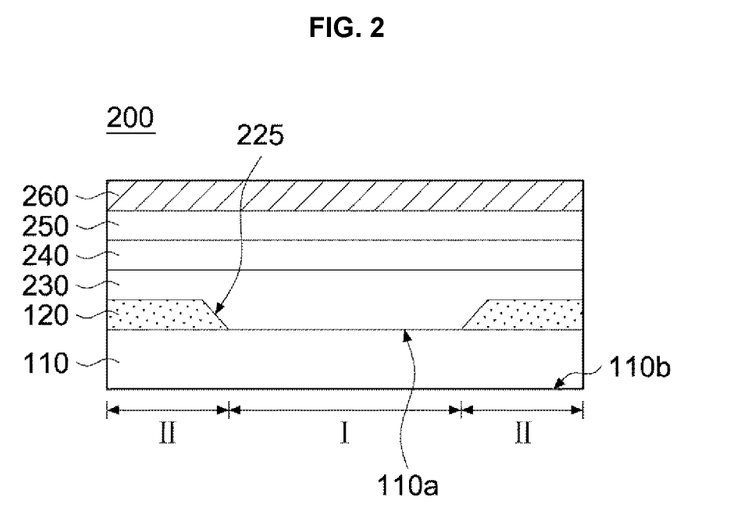
FIG. 2 is a schematic cross-sectional view illustrating a window substrate in accordance with an example embodiment of the present invention.

Referring to FIG. 2, a window substrate 200 may include a base substrate 110, a light-shielding pattern 120, a first adhesive layer 230, a polarizing layer 240, a second adhesive layer 250 and a touch sensor layer 260 as described with reference to FIG. 1.

A display region I and a non-display region II may be defined by the light-shielding pattern 120. An opening 225 exposing the display-region I may be defined by a sidewall of the light-shielding pattern 120 and a first surface 110a of the base substrate 110 at the display region I.

The first adhesive layer 230 may be attached to the light-shielding pattern 120 and the first surface 110a of the base substrate 110, and may sufficiently fill the opening 225. The first adhesive layer 230 may have substantially plane surface, and may serve as a leveling layer.

A leveled stacking face or attaching face may be provided by the first adhesive layer 230 so that the polarizing layer 240 and the touch sensor layer 260 may also have plane structures, and damages of the polarizing layer 240 and the touch sensor layer 260 due to curved or bended areas may be prevented while fabricating the window substrate 200.

As described with reference to the window substrate 100 of FIG. 1, a viscoelasticity ratio and a thickness ratio of the light-shielding pattern 120 and the first adhesive layer 230 may be adjusted. In the thickness ratio, a thickness of the first adhesive layer 230 may be defined as a thickness on the display region I.

Figure 3:
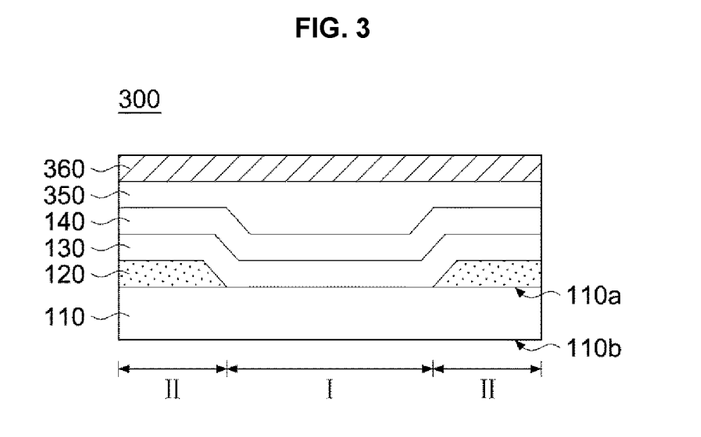
FIG. 3 is a schematic cross-sectional view illustrating a window substrate in accordance with an example embodiment of the present invention.

Referring to FIG. 3, a window substrate 300 may include a base substrate 110, a light-shielding pattern 120, a first adhesive layer 130, a polarizing layer 140, a second adhesive layer 350 and a touch sensor layer 360. As described with reference to the window substrate 100 of FIG. 1, a viscoelasticity ratio and a thickness ratio of the light-shielding pattern 120 and the first adhesive layer 130 may be adjusted.

The second adhesive layer 350 may be attached to the polarizing layer 140 to have a substantially plane top surface. In an implementation, the second adhesive layer 350 may have a relatively large thickness on the display region I, and may serve as a leveling layer.

A leveled stacking face or attaching face may be provided by the second adhesive layer 350 so that the touch sensor layer 360 may also have a plane structure, and damages of the touch sensor layer 360 due to curved or bended areas may be prevented while fabricating the window substrate 300.

Figure 4:
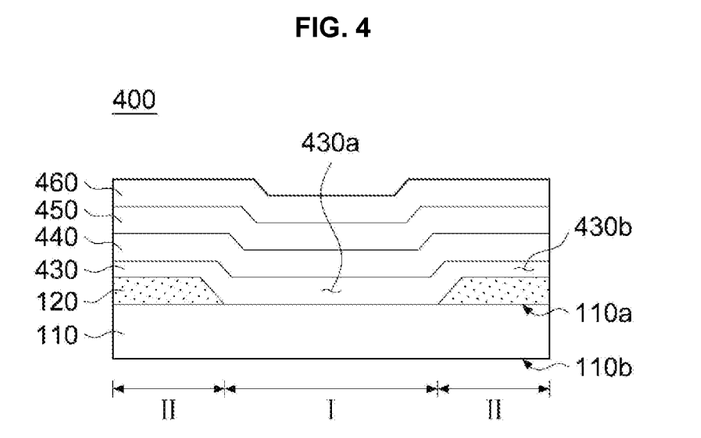
FIG. 4 is a schematic cross-sectional view illustrating a window substrate in accordance with an example embodiment of the present invention.

Referring to FIG. 4, a window substrate 400 may include a base substrate 110, a light-shielding pattern 120, a first adhesive layer 430, a polarizing layer 440, a second adhesive layer 450 and a touch sensor layer 460. As described with reference to FIG. 1, a viscoelasticity ratio and a thickness ratio of the light-shielding pattern 120 and the first adhesive layer 430 may be adjusted.

The first adhesive layer 430 may be formed to be thicker on a display region I than on a non-display region II. For example, a thickness of the first adhesive layer 430 may be relatively reduced on a top surface of the light-shielding pattern 120.

According to an implementation of the present invention, the first adhesive layer 430 may include a first portion 430a formed on the display region I and a second portion 430b formed on the non-display region II (e.g., on the top surface of the light-shielding pattern 120), and a thickness of the first portion 430a may be greater than a thickness of the second portion 430b. As described above, the thickness ratio of the light-shielding pattern 120 and the first adhesive layer 430 may be controlled within a predetermined range. In the thickness ratio, a thickness of the first adhesive layer 430 may be defined as a thickness of the first portion 430a.

The polarizing layer 440, the second adhesive layer 450 and the touch sensor layer 460 may be conformably formed along surface profiles of the first adhesive layer 430.

Hereinafter, a method of manufacturing a window substrate according to embodiments of the present invention is described in detail with reference to FIGS. 5 to 7. Detailed descriptions on materials the same as those described with reference to FIG. 1 are omitted herein.

Figure 5:
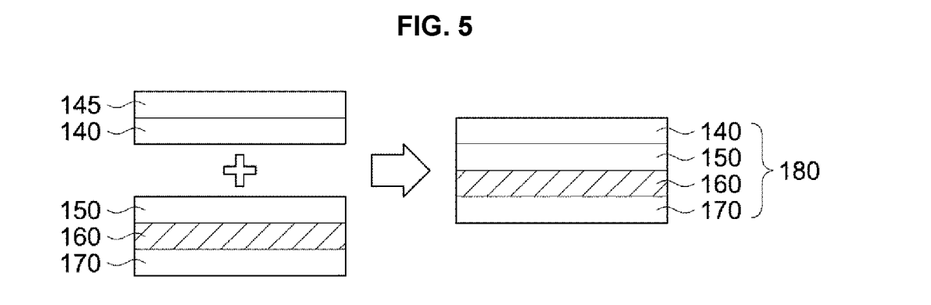
FIGS. 5 to 7 are schematic cross-sectional views illustrating a method of manufacturing a window substrate in accordance with an example embodiment of the present invention.

Referring to FIG. 5, a polarizing layer 140 and a touch sensor layer 160 may be formed on a first substrate layer 145 and a second substrate layer 170, respectively. A second adhesive layer 150 may be formed on the touch sensor layer 160.

For example, the polarizing layer 140 may be formed by coating a liquid crystal layer including a liquid crystal compound. In some embodiments, an alignment layer may be formed before forming the liquid crystal layer, and the liquid crystal layer may be coated and a curing process may be performed. The liquid crystal layer and the alignment layer may be formed by a coating process and/or a printing process such as a slit coating, a knife coating, a spin coating, a casting, a micro gravure coating, a gravure coating, a bar coating, a roll coating, a wire bar coating, a dip coating, a spray coating, a screen printing, a gravure printing, a flexo printing, an offset printing, an inkjet coating, a dispenser printing, a nozzle coating, a capillary coating, etc.

The touch sensor layer 160 may include a plurality of electrode patterns for a touch sensing and an insulation layer for insulating the electrode patterns. For example, a first conductive layer including a metal or a transparent conductive oxide (e.g., ITO, IZO, etc.) may be formed on the second substrate layer 170, and may be patterned to form first sensing electrodes. The insulation layer may be formed to at least partially cover the first sensing electrodes. A second conductive layer may be formed on the insulation layer, and may be patterned to form second sensing electrodes.

Subsequently, the first substrate layer 145 and the second substrate layer 170 may be laminated to each other such that the polarizing layer 140 and the second adhesive layer 150 may face each other. Accordingly, the second adhesive layer 150 may be attached to the polarizing layer 140 to form a first laminate 180 in which the polarizing layer 140 and the touch sensor layer 160 may be combined. After the forming the first laminate 180, the first substrate layer 145 may be detached or removed from the polarizing layer 140. In some embodiments, the second substrate layer 170 may be also removed after forming the first laminate 180.

Materials for the first substrate layer 145 and the second substrate layer 170 may not be specifically limited, and plastic substrates having improved delaminating property may be used.

Figure 6:
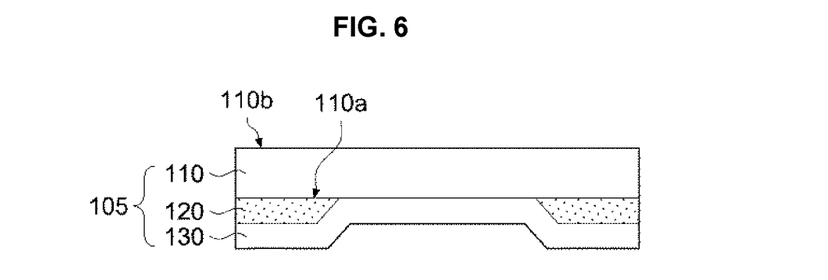

Referring to FIG. 6, a second laminate 105 including a base substrate 110, a light-shielding pattern 120 and a first adhesive layer 130 may be formed.

For example, the light-shielding pattern 120 may be formed on a first surface 110a of the base substrate 110 such that a display region and a non-display region of the window substrate may be divided. The light-shielding pattern 120 may be formed selectively in the non-display region as an embossed pattern by a deposition process, a coating process, a printing process or a combination thereof. A taper angle of a sidewall of the light-shielding pattern 120 with respect to the first surface 110a may be in a range from about 5° to about 30°.

The first adhesive layer 130 may be formed conformably along surfaces of the light-shielding pattern 120 and the first surface 110a of the base substrate 110. The first adhesive layer 130 may be formed by the above mentioned coating process and/or the printing process.

As described above, a viscoelasticity ratio of the light-shielding pattern 120 relative to the first adhesive layer 130 may be about 75,000 or less. In some embodiments, the viscoelasticity ratio may be in a range from about 3,000 to about 75,000. A thickness ratio of the light-shielding pattern 120 relative to the first adhesive layer 130 may be about 0.6 or less. In some embodiments, the thickness ratio may be in a range from about 0.1 to about 0.6.

Bubbles may be suppressed between the first adhesive layer 130 and the base substrate 110 when attaching the first adhesive layer 130 within the ranges of the viscoelasticity ratio and the thickness ratio, and further within the range of the taper angle so that an optical reliability in a display region may be enhanced.

As described with reference to FIG. 2, the first adhesive layer 130 may be formed to have a substantially plane exposed surface.

Figure 7:
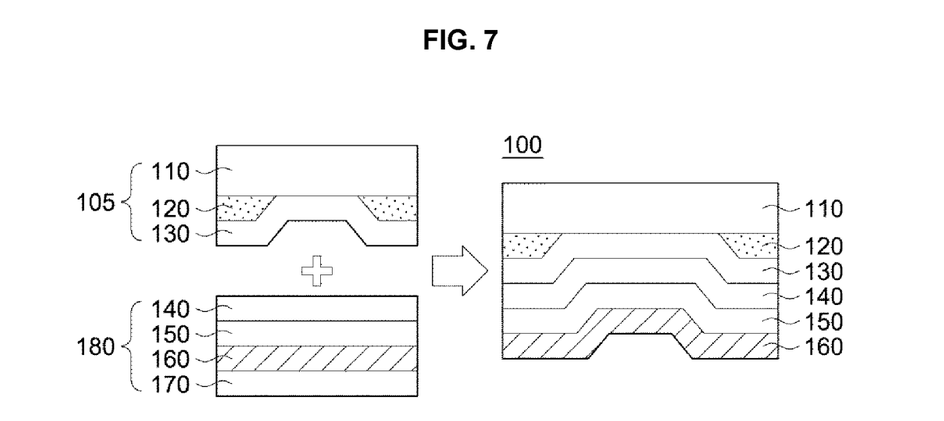

Referring to FIG. 7, the first laminate 180 and the second laminate 105 may be combined with each other to obtain a window substrate 100. For example, the first laminate 180 and the second laminate 105 may be laminated to each other such that the first adhesive layer 130 and the polarizing layer 140 may face each other to form the window substrate 100. Subsequently, the second substrate layer 170 may be detached or removed from the touch sensor layer 160.

According to the method as described above, the polarizing layer 140 may not be directly formed on a stepped portion generated by the light-shielding pattern 120, but may be formed on the first substrate layer 145, and then attached to the first adhesive layer 130. Thus, an orientation failure due to the stepped portion may be prevented. Further, the touch sensor layer 160 may be formed on the second substrate layer 170, and then may be transferred on the polarizing layer 140. Thus, defects or damages of the polarizing layer 140 or the touch sensor layer 160 caused when the touch sensor layer 160 is formed directly on the polarizing layer 140 or the polarizing layer 140 is directly formed on the touch sensor layer 160 may be avoided.

Additionally, after forming the first laminate 180 including the polarizing layer 140 and the touch sensor layer 160 by the transfer process, the first laminate 180 may be adhered to the second laminate 105 including the first adhesive layer 130 and the base substrate 110. Thus, a process convenience may be improved compared to performing a coating process for each layer, and thus a production cost may be reduced.

Further, the second substrate layer 170 may be removed after forming the window substrate, and an additional substrate for the touch sensor layer 160 may be omitted so that a thin-layered structure may be achieved.

Additionally, the present invention provides an image display device including the window substrate as described above. The window substrate may be combined with a display panel included in an OLED device, an LCD device. The display panel may include a pixel circuit including a thin film transistor (TFT) arranged on a substrate, a pixel portion or a light-emitting portion electrically connected to the pixel circuit. For example, the touch sensor layer of the window substrate may be attached on the display panel, and an additional adhesive layer and/or a leveling layer may be included between the touch sensor layer and the display panel. The substrate of the display panel may include a resin such as polyimide or a plastic. In this case, a flexible display device combined with the window substrate may be implemented. The window substrate may be also applied to various image display devices such as a FED device, a PDP device, etc.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

EXPERIMENTAL EXAMPLE 1

Evaluation on Bubble Generation at Stepped Portion According to Viscoelasticity Ratios A light-shielding pattern having a thickness of 10 μm was formed by a screen printing process on a peripheral portion of a base substrate including polymethylmethacrylate (PMMA). An OCA material was coated to form an adhesive layer having a thickness of 25 μm to cover a stepped portion generated by the light-shielding pattern. As listed in Table 1 below, storage modulus values of the light-shielding pattern and the adhesive layer were changed to form samples of Examples and Comparative Examples, and bubble generation at the stepped portion was evaluated when coating the adhesive layer. Each modulus of the light-shielding pattern and the adhesive layer was measured using dynamic mechanical analyzer (DMA) and rheometer, respectively.

TABLE 1

| | Storage Modulus of Light-shielding Pattern (A) (MPa) | Storage Modulus of Adhesive Layer (B) (MPa) | Viscoelasticity Ratio (A/B) | Bubble Generation at Stepped Portion |
|---|---|---|---|---|
| Example 1 | 2,000 | 0.04 | 50,000 | X |
| Example 2 | 3,000 | 0.04 | 75,000 | X |
| Example 3 | 2,000 | 0.6 | 3,333 | X |
| Example 4 | 3,000 | 0.6 | 5,000 | X |
| Example 5 | 4,000 | 0.6 | 6,667 | X |
| Comparative Example 1 | 8,000 | 0.1 | 80,000 | ○ |
| Comparative Example 2 | 4,000 | 0.04 | 100,000 | ○ |
| Comparative Example 3 | 5,000 | 0.04 | 125,000 | ○ |
| Comparative Example 4 | 6,000 | 0.04 | 150,000 | ○ |

Referring to Table 1, in the Examples having the viscoelasticity ratio of 75,000 or less, bubbles were not observed due to the stepped portion of the light-shielding pattern during or after attaching the adhesive layer. However, in the Comparative Examples having the viscoelasticity ratio exceeding 75,000 (specifically, 80,000 or more), bubbles were generated at the stepped portion to cause delamination between the adhesive layer and the base substrate, or between the adhesive layer and the light-shielding pattern.

EXPERIMENTAL EXAMPLE 2

Evaluation on Bubble Generation at Stepped Portion According to Thickness Ratios A light-shielding pattern and an adhesive layer were formed by a method substantially the same as that of Experimental Example 1. Storage modulus values of the light shielding pattern and the adhesive layer were fixed to 3,000 MPa and 0.04 MPa, respectively. As listed in Table 2 below, thicknesses of the light-shielding pattern and the adhesive layer were changed to form samples of Examples and Comparative Examples, and bubble generation at the stepped portion was evaluated when coating the adhesive layer.

TABLE 2

| | Thickness of Light-shielding Pattern (C) (μm) | Thickness of Adhesive Layer (D) (μm) | Thickness Ratio (C/D) | Bubble Generation at Stepped Portion |
|---|---|---|---|---|
| Example 6 | 6 | 25 | 0.24 | X |
| Example 7 | 6 | 50 | 0.12 | X |

TABLE 2-continued

|  | Thickness of Light-shielding Pattern (C) (μm) | Thickness of Adhesive Layer (D) (μm) | Thickness Ratio (C/D) | Bubble Generation at Stepped Portion |
|---|---|---|---|---|
| Example 8 | 8 | 25 | 0.32 | X |
| Example 9 | 8 | 50 | 0.16 | X |
| Example 10 | 12 | 25 | 0.48 | X |
| Example 11 | 12 | 50 | 0.24 | X |
| Example 12 | 15 | 25 | 0.6 | X |
| Example 13 | 15 | 50 | 0.3 | X |
| Comparative Example 5 | 15 | 20 | 0.75 | ○ |
| Comparative Example 6 | 21 | 25 | 0.8 | ○ |
| Comparative Example 7 | 25 | 25 | 1 | ○ |

Referring to Table 2, in the Examples having the thickness ratio of 0.6 or less, bubbles were not observed due to the stepped portion of the light-shielding pattern during or after attaching the adhesive layer. However, in the Comparative Examples having the thickness ratio exceeding 0.6, bubbles were generated at the stepped portion to cause delamination between the adhesive layer and the base substrate, or between the adhesive layer and the light-shielding pattern.

EXPERIMENTAL EXAMPLE 3

Evaluation on Bubble Generation at Stepped Portion According to Taper Angles of Light-Shielding Pattern A light-shielding pattern and an adhesive layer were formed by a method substantially the same as that of Experimental Example 1. Specifically, thicknesses of the light shielding pattern and the adhesive layer were fixed to 10 μm and 25 μm, respectively, and storage modulus values of the light shielding pattern and the adhesive layer were fixed to 3,000 MPa and 0.04 MPa, respectively. As listed in Table 3 below, samples of Examples and Comparative Examples were obtained while increasing taper angles of a sidewall of the light-shielding pattern, and bubble generation at the stepped portion was evaluated when coating the adhesive layer.

TABLE 3

|  | Taper Angle of Sidewall of Light-shielding Pattern (°) | Bubble Generation at Stepped Portion |
|---|---|---|
| Example 14 | 5 | X |
| Example 15 | 15 | X |
| Example 16 | 25 | X |
| Example 17 | 30 | X |
| Comparative Example 8 | 35 | ○ |
| Comparative Example 9 | 45 | ○ |

Referring to Table 3, in the Examples having the taper angles of 5° to 30°, bubbles were not observed due to the stepped portion of the light-shielding pattern during or after attaching the adhesive layer. However, in the Comparative Examples having the taper angles exceeding 30°, bubbles were generated at the stepped portion to cause delamination between the adhesive layer and the base substrate, or between the adhesive layer and the light-shielding pattern.

What is claimed is:

1. A window substrate, comprising:
    a base substrate including a display region and a non-display region;
    a light-shielding pattern disposed on a surface of the base substrate in the non-display region to define the display region and the non-display region;
    a first adhesive layer formed along a surface of the light-shielding pattern and the surface of the base substrate;
    a polarizing layer on the first adhesive layer; and
    a touch sensor layer on the polarizing layer,
    wherein a viscoelasticity ratio of the light-shielding pattern relative to the first adhesive layer is 75,000 or less, and a thickness ratio of the light-shielding pattern relative to the first adhesive layer is 0.6 or less.

2. The window substrate according to claim 1, wherein the viscoelasticity ratio is in a range from 3,000 to about 75,000.

3. The window substrate according to claim 1, wherein the thickness ratio is in a range from 0.1 to 0.6.

4. The window substrate according to claim 1, wherein a taper angle of a sidewall of the light-shielding pattern with respect to the surface of the base substrate is in a range from 5° to 30°.

5. The window substrate according to claim 1, wherein the polarizing layer includes a liquid crystal layer.

6. The window substrate according to claim 1, wherein the first adhesive layer is relatively thicker on the display region.

7. The window substrate according to claim 6, wherein the thickness ratio is defined as a ratio of a thickness of the light-shielding pattern relative to a thickness of the first adhesive layer on the display region.

8. The window substrate according to claim 6, wherein the first adhesive layer has a plane top surface.

9. The window substrate according to claim 1, further comprising a second adhesive layer interposed between the polarizing layer and the touch sensor layer.

10. The window substrate according to claim 9, wherein the second adhesive layer has a plane top surface.

11. The window substrate according to claim 1, wherein the base substrate includes at least one selected from a group consisting of polyethersulphone, polyacrylate, polyetherimide, polyethylene naphthalate, polyethylene terephthalate, polyphenylene sulfide, polyallylate, polyimide, polycarbonate, cellulose triacetate and cellulose acetate propionate.

12. An image display device comprising the window substrate according to claim 1.

13. A method of manufacturing a window substrate, comprising:
    forming a polarizing layer and a touch sensor layer on a first substrate layer and a second substrate layer, respectively;
    laminating the first substrate layer and the second substrate layer such that the polarizing layer and the touch sensor layer face each other to form a first laminate;
    forming a light-shielding pattern and a first adhesive layer on a base substrate to form a second laminate; and
    laminating the first laminate and the second laminate such that the first adhesive layer and the polarizing layer face each other,
    wherein the light-shielding pattern is formed on a peripheral portion of a surface of the base substrate, and the first adhesive layer is formed on the surface of the base substrate to cover the light-shielding pattern; and
    a viscoelasticity ratio of the light-shielding pattern relative to the first adhesive layer is 75,000 or less, and a thickness ratio of the light-shielding pattern relative to the first adhesive layer is 0.6 or less.

14. The method according to claim 13, further comprising removing the first substrate layer after forming the first laminate.

15. The method according to claim 14, further comprising removing the second substrate layer after forming the first laminate or after laminating the first laminate and the second laminate.

16. The method according to claim 13, wherein the viscoelasticity ratio is in a range from 3,000 to about 75,000.

17. The method according to claim 13, wherein the thickness ratio is in a range from 0.1 to 0.6.

* * * * *